United States Patent
Reuschel et al.

(10) Patent No.: US 9,423,094 B2
(45) Date of Patent: Aug. 23, 2016

(54) LIGHTING DEVICE WITH 3D-EFFECT

(75) Inventors: Jens Dietmar Reuschel, Ingolstadt (DE); Christoph Schmitz, Abensberg (DE)

(73) Assignee: AUDI AG, Ingolstadt (DE)

(*) Notice: Subject to any disclaimer, the term of this patent is extended or adjusted under 35 U.S.C. 154(b) by 244 days.

(21) Appl. No.: 14/009,675

(22) PCT Filed: Mar. 30, 2012

(86) PCT No.: PCT/EP2012/001415
§ 371 (c)(1),
(2), (4) Date: Dec. 10, 2013

(87) PCT Pub. No.: WO2012/136334
PCT Pub. Date: Oct. 11, 2012

(65) Prior Publication Data
US 2014/0321136 A1  Oct. 30, 2014

(30) Foreign Application Priority Data
Apr. 4, 2011 (DE) .......................... 10 2011 016 000

(51) Int. Cl.
*F21S 8/10* (2006.01)
*B60Q 3/00* (2006.01)
(Continued)

(52) U.S. Cl.
CPC ............. *F21S 48/2281* (2013.01); *B60Q 3/004* (2013.01); *B60Q 3/044* (2013.01); *B60Q 9/00* (2013.01); *B60Q 9/008* (2013.01); *G02B 6/0076* (2013.01); *G02B 6/004* (2013.01); *G02B 6/0058* (2013.01)

(58) Field of Classification Search
CPC ...... G09F 13/18; G02B 6/006; G02B 6/0076; G02B 6/0036; G02B 6/004; G02B 6/0055; G02B 6/0058; F21S 48/2281; B60Q 3/004; B60Q 3/044; B60Q 9/008; B60Q 9/00
See application file for complete search history.

(56) References Cited

U.S. PATENT DOCUMENTS 1,930,359 A  11/1931  Hilgenberg
4,016,534 A * 4/1977  Kobayashi et al. ........... 340/461
(Continued)

FOREIGN PATENT DOCUMENTS

CN  101449309  6/2009
CN  101839445  9/2010
(Continued)

OTHER PUBLICATIONS

International Search Report issued by the European Patent Office in International Application PCT/EP2012/001415 on Sep. 4, 2012.
(Continued)

*Primary Examiner* — Stephen F Husar
*Assistant Examiner* — Danielle Allan
(74) *Attorney, Agent, or Firm* — Henry M. Feiereisen LLC.

(57) ABSTRACT

A lighting device for a motor vehicle includes several flat light-conducting elements that are arranged in layers one behind the other in a layer arrangement. The individual light-conducting elements do not touch one another and are clearly spaced apart from one another. Each of the light-conducting elements includes a light-scattering structural element. An illuminating device is optically coupled to each of the light-conducting elements in order to couple light into the light-conducting elements. Light is coupled out of the light-conducting elements by means of the structural elements.

11 Claims, 1 Drawing Sheet

(51) Int. Cl.
  *B60Q 3/04* (2006.01)
  *B60Q 9/00* (2006.01)
  *F21V 8/00* (2006.01)

(56) References Cited

U.S. PATENT DOCUMENTS

| | | | |
|---|---|---|---|
| 4,974,354 | A | 12/1990 | Hembrook, Jr. |
| 6,160,475 | A | 12/2000 | Hornung et al. |
| 7,665,869 | B2 | 2/2010 | Spazier |
| 2009/0219734 | A1 | 9/2009 | Sawada et al. |
| 2012/0032592 | A1 | 2/2012 | Breunig et al. |

FOREIGN PATENT DOCUMENTS

| | | |
|---|---|---|
| CN | 201731379 | 2/2011 |
| DE | 198 22 636 A1 | 11/1999 |
| DE | 100 32 927 | 1/2002 |
| DE | 103 47 424 | 5/2005 |
| DE | 103 60 729 | 7/2005 |
| DE | 102004054732 | 5/2006 |
| DE | 102008004625 | 7/2009 |
| DE | 102008060354 | 6/2010 |
| DE | 102009060355 | 6/2011 |
| EP | 0 962 693 | 12/1999 |
| EP | 2 009 615 | 12/2008 |
| WO | WO 2010/118795 | 10/2010 |

OTHER PUBLICATIONS

Chinese Search Report issued on Jul. 31, 2015 with respect to counterpart Chinese patent application 201280005987.5.

Translation of Chinese Search Report issued on Jul. 31, 2015 with respect to counterpart Chinese patent application 201280005987.5.

* cited by examiner

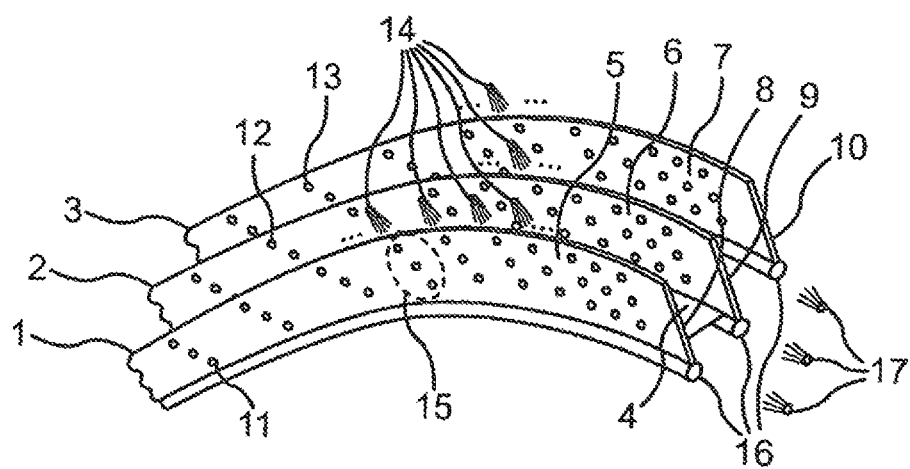

LIGHTING DEVICE WITH 3D-EFFECT

CROSS-REFERENCES TO RELATED APPLICATIONS

This application is the U.S. National Stage of International Application No. PCT/EP2012/001415, filed Mar. 30, 2012, which designated the United States and has been published as International Publication No. WO 2012/136334 and which claims the priority of German Patent Application, Serial No. 10 2011 016 000.0, filed Apr. 4, 2011 pursuant to 35 U.S.C. 119(a)-(d).

BACKGROUND OF THE INVENTION

The present invention relates to a lighting device for a motor vehicle with a light source and multiple flat, light conducting elements, which are arranged one behind another to form a layered arrangement.

For illuminating the interior, motor vehicles normally have multiple lights or lighting devices. In most cases, these are small lamps, which can be turned on or off. Usually, these do not serve for carrying information that may be visually perceived by the vehicle occupant.

In addition, modern vehicles have multiple assist systems. On one hand, the driver is to be supported (for example lane assist system, takeover assist system, distance warning system etc.) and on the other hand, passengers can also be warned (for example warning of a passing bicycle during exiting). These assist systems mostly provide visual signals or warnings. It is therefore important to provide these visual signals and warnings at sites, which are located in the direction of viewing of the vehicle occupant.

From DE 103 47 424 A1 a transparent pane arrangement as element of the door, a window or a wall is known. It has one or multiple light sources for introducing or coupling light into the pane arrangement so that light can propagate in the interior of the pane arrangement between the outer pane surfaces in the direction along the sides of pane surface. The pane arrangement includes light deflection zones, which deflect at least a portion of the light reaching the light deflection zones, in the direction transverse to the sides of the pane surface so that the light exits from the pane arrangement.

In addition, a multilayered plastic pane is described in the printed publication DE 10 2008 004 625 B4. It has at least one partially transparent carrier, a first hot-melt adhesive film on the carrier and a first polyester foil on the first hot-melt adhesive film. In addition it has an optically active functional layer which is connected to the first polyester foil, a second polyester foil, which is connected to the optically active functional layer, and a second hot-melt adhesive film on the second polyester layer. Finally, it has an at least partially transparent cover layer on the second hot-melt adhesive film.

SUMMARY OF THE INVENTION

It is an object of the present invention to provide a lighting device for a motor vehicle with which meaningful information can be visually transmitted to a vehicle occupant.

According to the invention, this object is solved by a lighting device for a motor vehicle with
multiple flat light conducting elements which are arranged to form a layered arrangement one behind another, wherein
the individual light conducting elements do not contact one another and are significantly spaced apart from each other,
each of the light conducting elements has at least one light scattering structural element,
an illumination device is optically coupled to each of the light conducting elements in order to couple light into the light conducting elements, and
light is coupled out of the light conducting elements by the structural elements.

Advantageously, the actual three-dimensional structure of the lighting device enables generating a three-dimensional visual impression. With this it is also possible to use three-dimensional visual effects for transmission of information. In contrast to two-dimensional displays, a depth effect can thus also be used for transmitting corresponding information to the vehicle occupant.

In an embodiment, the structural elements of the light conducting elements can have at least in part the same geometric shape. This results in a group of structural elements in the multiple light conducting elements, which are well suited for generating, three-dimensional effects.

In addition, the light conducting elements can have essentially the same size. This has advantages regarding manufacture and mounting. In this case, a lighting module or a lighting device with multiple light conducting element with equal size can for example be easily manufactured.

For example, the light conducting elements can be configured band-shaped. This band shape has the advantage that three-dimensional lighting strips can be formed therewith, which cause three-dimensional light effects according to the invention.

According to a further embodiment, all light conducting elements can be three-dimensionally curved in the same manner. This can for example be well realized with the above-mentioned thin, strip-shaped light conducting elements. The three-dimensional curvature has the advantage that the lighting device can be space-efficiently accommodated in the interior of the motor vehicle. For example it can be integrated over a large surface into a door panel or the ceiling of the vehicle.

In a further preferred embodiment, a separate light conductor is arranged on an edge of each of the light conducting elements, with which separate light conductor light is coupled into the edge of the light conducting element. With this, light can be coupled in over a very long section of the light conducting element. The light distribution in the interior of the light conducting element is then even more uniform.

Further, the lighting device can have a control device for controlling the lighting device so that the light conducting element can be illuminated or shone through with the lighting device in a time dependent manner, so that the structural elements light up with a sequential light effect. Thus, the individual structural elements of the respective light conducting elements are illuminated with a temporal delay and the structural elements have a spatial offset relative to each other and relative to a predetermined viewing direction. The temporal offset of the illumination together with the spatial offset of the structural elements then leads to a sequential light effect. The three-dimensional arrangement of the structural elements results in a three-dimensional sequential light effect.

The light conducting elements can also have a common surface normal and each of the light conducting elements in the respective light conducting element can have a different distance to the surface normal than another one of the structural elements. This means that in viewing direction (which corresponds with the surface normal), a group of structural elements, each of which is assigned to a different light conducting element, has a spatial offset relative to the other structural elements of this group.

It is especially advantageous when an assist system for a motor vehicle is equipped with a lighting device according to the invention as described above. This can be used for generating a visual signal, in particular a warning signal. Thus, a motor vehicle can be equipped with such an assist system or with a lighting device as mentioned above for supporting the driver or a passenger.

BRIEF DESCRIPTION OF THE DRAWING

The present invention is explained in more detail by way of the included drawing, which shows an exemplary embodiment of a lighting device according to the invention.

The exemplary embodiments explained in more detail below are preferred embodiments of the present invention.

DETAILED DESCRIPTION OF PREFERRED EMBODIMENTS

A motor vehicle has for example a door panel into which a lighting module is integrated according to the symbolic representation of the FIGURE. Such a lighting module can however also be mounted in the ceiling of a vehicle as light strip or transversely in the cockpit below the windshield. Of course, other mounting sites for such a lighting module in the interior of the vehicle are also possible. With the lighting module, a three-dimensional lighting effect can be achieved. This may be used solely for illumination purposes or also for transmitting information. Especially visual signals, and in particular warning signals can be outputted, as explained in more detail below.

In the concrete example, the lighting device has three band-shaped light conducting elements 1, 2 and 3. The light conducting elements 1, 2, 3 are arranged in parallel behind one another, resulting in a layered arrangement.

In the present example the individual light conducting elements 1, 2, 3 are spatially curved. This also results in a spatially curved, layered arrangement of the light conducting elements. The spatial curvature can be predetermined, however, it can also be adjusted retroactively when the entire lighting module or the lighting device is overall correspondingly elastic.

The individual light conducting elements 1,2 3 are spaced apart from each other so that they do not contact one another. This space can for example be implemented by a spacer 4. The greater the distance between the light conducting elements, the stronger the achieved spatial light effect can be. The distance between the individual light conducting elements 1, 2, 3 does not have to be equal.

In the embodiment of the FIGURE, the lighting device has three similarly configured light conducting elements 1, 2, 3. However, it can also have more than three such light conducting elements in order to improve the 3D-effect. At a minimum, the lighting device can also have two such light conducting elements.

The shape of the individual light conducting elements can generally be chosen freely. It is only important that each light conducting element is configured essentially flat as band or plate. With this, each light conducting element 1, 2, 3 has two main faces, i.e., a front face and a rear face, of which only the front faces 5, 6, 7 can be seen in the FIGURE. The borders 8, 9, 10 are correspondingly narrow. The light conducting elements 1, 2, 3 are preferably configured plate-shaped, band-shaped or film-shaped.

The individual light conducting elements 1, 2, 3 are manufactured from a partially transparent material (for example PMMA=poly methyl methacrylate). They can retain and conduct light in the interior in part by total reflection.

On the front face 5, 6, 7, on the rear face or in the interior of the light conducting elements, optical imperfections 11, 12, 13 can be located. Only few of these optical imperfections, which are also referred to as structural elements, are provided with reference numerals in the example of the FIGURE.

The optical imperfections 11, 12, 13 i.e., the structural elements, are for example introduced into the respective light conducting elements 1, 2, 3 by milling, laser treatment, sand blasting or the like. They can be located at the surface or in the interior of the light conducting element.

The structural elements can have any desired geometric shape. Thus, they can for example be points, which are outlined in the FIGURE. They can however also be special graphics or arrangements. For example they are arrows to indicate a direction.

The structural elements are illuminated individually or in groups. For this, for example punctiform light sources such as LEDs 14 are provided. In the instant case, each of these points 14 illuminates a group 15 of structural elements.

According to the example of the FIGURE, the light conducting elements can each be illuminated with a light conductor 16. In this case, a light conductor 16 is arranged on each light conducting element 1, 2, 3 at the border in longitudinal direction. By means of further light sources 17 for example LEDs) light is coupled into the light conductors 16. These in turn couple light into the light conducting elements 1, 2, 3 along the entire length of the respective light conducting elements 1, 2, 3. Depending on the transparency of the light conducting elements these light up with their entire surface or essentially only the imperfections, i.e., the structural elements 11, 12, 13. When the structural elements 11, 12, 13 are illuminated with the punctiform light sources 14, only those structural elements 11, 12, 13 or groups 15, light up onto which light is concretely directed. The illumination by the light sources 14 and the light sources 17 can be white or colored (color LED; RGB).

The illumination device of the lighting device, which includes the different light sources 14, 17, can be controlled with a special control device (not shown in the FIGURE). Such a control allows illuminating the layers of the three-dimensional structure, i.e. the light conducting elements 1, 2, 3 of the lighting device, in a time dependent manner. As a result of the offset of the structural elements 11, 12, 13 in a spatial direction starting from a predetermined viewing axis and a corresponding temporal control (temporal offset), a three-dimensional animated effect can be achieved. For such animated effects the individual light sources 14 and the illuminated light conductors 16, which are respectively arranged on the longitudinal edges of the layers or light conducting elements, can be used. In particular, a local sequential light can be generated by the individual light sources 14, which either runs only in one layer or respectively one light conducting element, or in all layers or respectively light conducting elements 1, 2, 3. In the latter case a three-dimensional sequential light results.

In an example, such a lighting device can be used in a vehicle as line light with three-dimensional light effect or as three-dimensional warning light. When such a lighting device is for example built as longitudinal lighting module in the cockpit over the entire length of the vehicle, it may only be used as line light with 3D-effect in white, in order to achieve a corresponding depth effect. However, with local illumination of the individual structural elements it can also serve for warning of a possible collision (red sequential light).

The warning function can generally be realized in that a control device checks a signal. When the signal satisfies a predetermined condition, the control device controls a lighting device provided for this purpose. The lighting device is constructed as described above.

Warning functions are in particular helpful for driver assist systems as mentioned above. Thus, the above lighting device can for example be used for a "distance warner". The "distance warner" continuously controls whether a defined distance to the individual ahead is maintained. The control is implemented for example by means of radar. When a minimal distance is fallen below, the driver has to be warned appropriately. In the instant case this can for example occur by means of the described lighting device situated below the windshield, on the dashboard or the like.

The lighting device according to the invention can also be used for a driver assist system "takeover warner". In this case, for example a radar scans the rear region of a motor vehicle. When an overtaking vehicle is detected and when the blinker of the own vehicle is set to the lane of the overtaking vehicle or when a steering angle of the own vehicle in the direction of the lane of the overtaking vehicle is detected, a corresponding takeover warning can be visually outputted. This is realized for example in that a sequential light indicates a takeover maneuver on the inside of the door on the side of the overtaking vehicle. For example, by a frontward moving, red sequential light.

A further example for an assist system in which the lighting device according to the invention can be used is an "exit assist system". For example, when the vehicle stops adjacent a bicycle lane and a vehicle occupant intends to exit, a corresponding illumination of the door can indicate whether the door can be opened safely. When no risk exists, the inside of the door can for example be illuminated in green, while in the case of danger, i.e. for example when a bicycle approaches or passes, the inside of the door can light up in red.

Other driver assist systems can also be equipped with the lighting device according to the invention. The lighting device can have a large surface because it represents a valuable decorative element.

The invention claimed is:

1. A lighting device for a motor vehicle comprising:
   plural, flat light conducting elements arranged in spaced apart relationship one behind the other to form a layered arrangement, without contacting one another, each of said light conducting elements having at least two light scattering structural elements;
   an illumination device optically coupled to each of the light conducting elements and comprising plural light sources, each of said plural light sources exclusively illuminating one of the structural elements or exclusively illuminating one subgroup of the structural elements in each respective one of the light conducting elements so that only the one structural element or the one subgroup of the structural elements lights up when illuminated by the light source, said subgroup consisting of less than all of the structural elements respectively present in the respective light conducting element; and
   a control device for controlling the illumination device, so as to generate a sequential light by means of the plural light sources.

2. The lighting device of claim 1, wherein the structural elements are of same geometric shape.

3. The lighting device of claim 1, wherein, the light conducting elements are essentially of same size.

4. The lighting device of claim 1, wherein all of the light conducting elements are configured band-shaped.

5. The lighting device of claim 1, wherein all of the light conducting elements are three-dimensionally curved in a same manner.

6. The lighting device of claim 1, further comprising a light conductor arranged on an edge of each of the light conducting elements, said light conductor coupling light into the edge of the light conducting elements.

7. The lighting device of claim 1, wherein the light conducting elements have a common surface normal and each of the structural elements in a respective one of the light conducting elements has a different distance to the surface normal.

8. An assist system for a motor vehicle, comprising the lighting device of claim 1, wherein the lighting device is constructed for generating a visual signal.

9. The assist system of claim 8, wherein the signal is a warning signal.

10. A motor vehicle, comprising the assist system of claim 8.

11. A motor vehicle, comprising the lighting device of claim 1.

* * * * *